May 10, 1955

R. E. SEIDLE 2,708,047

MOVABLE BODY HAULING UNIT FOR VEHICLES

Filed March 5, 1951

INVENTOR
Ralph E. Seidle
BY Ernest J. Mechlin
HIS ATTORNEY

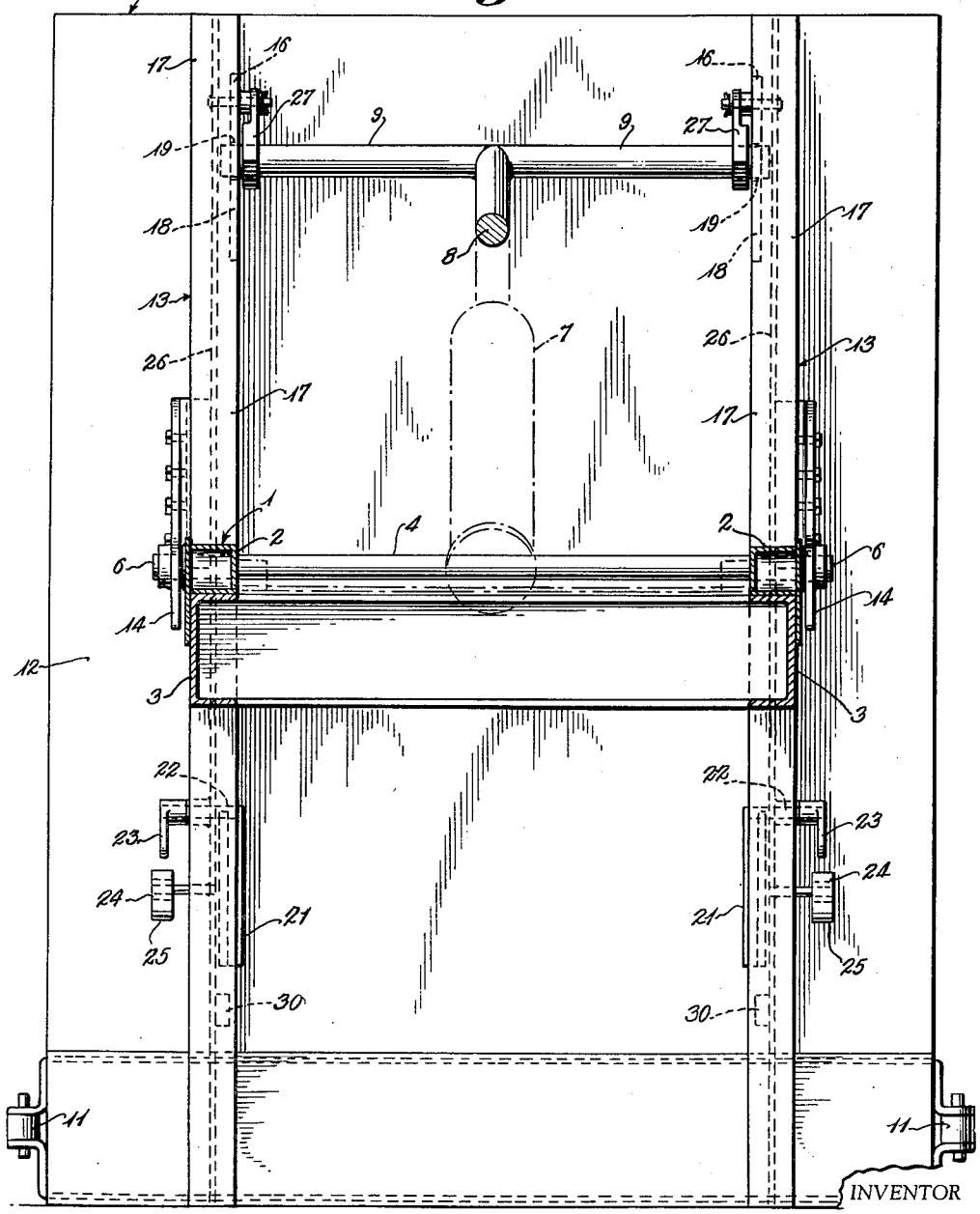

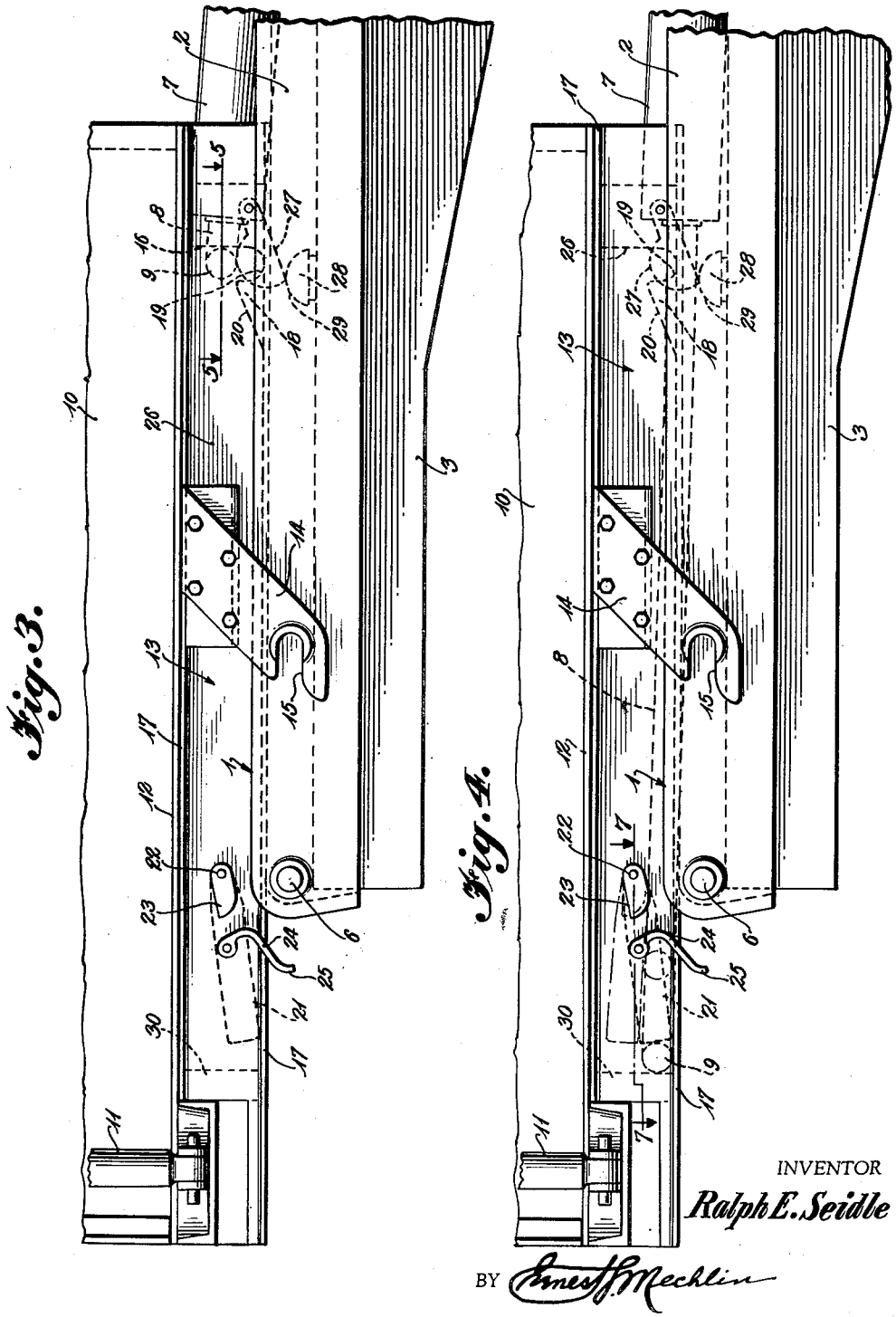

May 10, 1955  R. E. SEIDLE  2,708,047
MOVABLE BODY HAULING UNIT FOR VEHICLES
Filed March 5, 1951  4 Sheets-Sheet 4
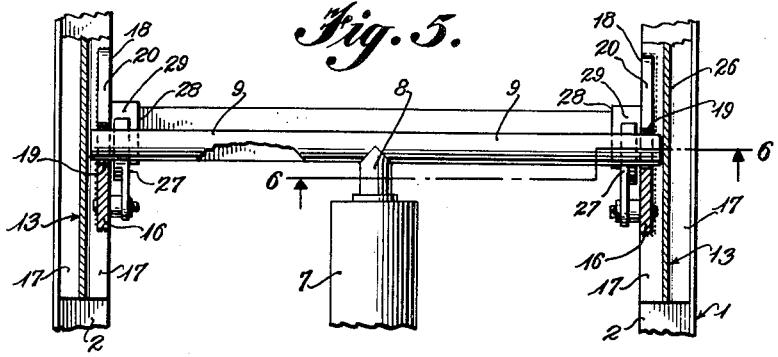
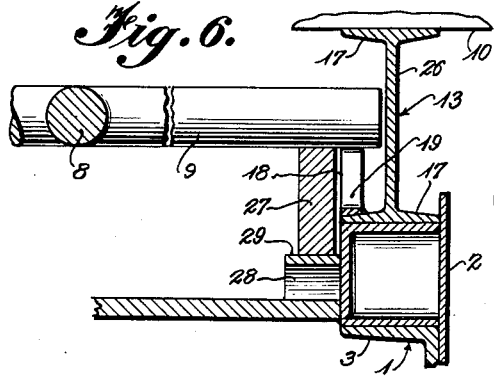
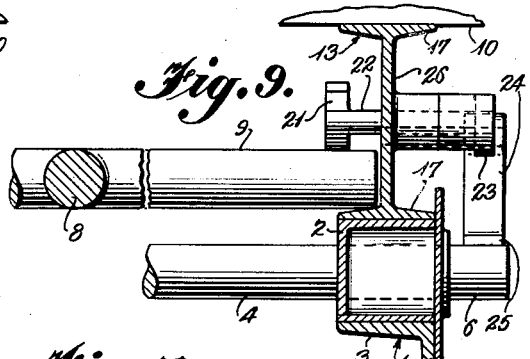
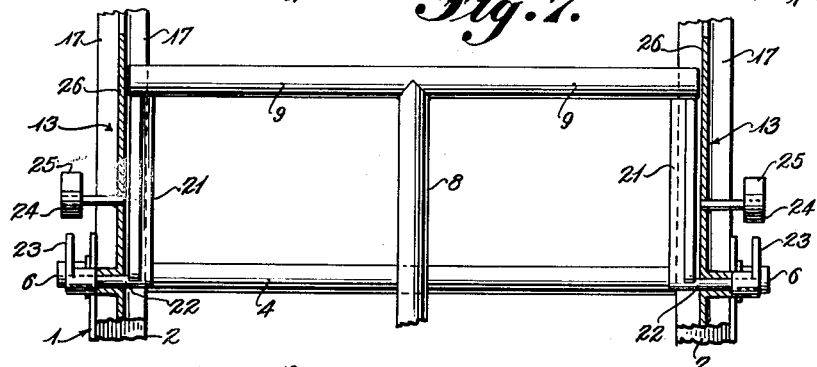
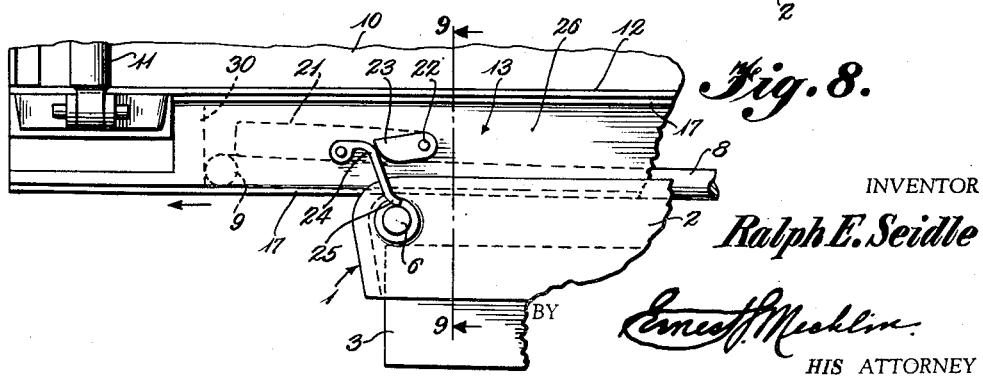
INVENTOR
Ralph E. Seidle
BY
HIS ATTORNEY United States Patent Office 2,708,047
Patented May 10, 1955

2,708,047
MOVABLE BODY HAULING UNIT FOR VEHICLES

Ralph E. Seidle, Martinsville, Va.

Application March 5, 1951, Serial No. 213,871

10 Claims. (Cl. 214—515)

This invention relates to hauling apparatus and has for its primary object the provision of an improved hauling unit for application to trucks and other vehicles for handling palletized loads.

Another object of the invention is to provide an improved hauling unit having a tiltable body for clamping and loading bricks and like palletizable loads.

An additional object of the invention is to provide an improved hauling unit having mechanism whereby a hydraulic piston of relatively short stroke is enabled to both tilt and shaft the body of the unit relative to the vehicle on which it is mounted.

A further object of the invention is to provide an improved hauling unit having a tiltable body wherein a hydraulic piston of relatively short stroke is enabled not only to tilt and shift the body relative to the vehicle on which it is mounted, but to securely lock the body against movement in transit.

Other objects and advantages of the invention will appear hereinafter in the detailed description, be particularly pointed out in the appended claims and illustrated in the accompanying drawings in which:

Figure 2 is a vertical sectional view on an enlarged scale, taken along the lines 2—2 of Figure 1;

Figure 3 is a fragmentary side elevational view on an enlarged scale showing the position of the body relative to the frame at the end of the first stroke of the hydraulic piston;

Figure 4 is a fragmentary side elevational view on an enlarged scale showing the position of the body relative to the frame at the beginning of the second stroke of the hydraulic piston;

Figure 5 is a horizontal sectional view, taken along the lines 5—5 of Figure 3;

Figure 6 is a horizontal sectional view on an enlarged scale, taken along the lines 6—6 of Figure 5;

Figure 7 is a horizontal sectional view, taken along the lines 7—7 of Figure 4;

Figure 8 is a fragmentary side elevational view on the scale of Figures 2 and 3, showing the action of the releasing mechanism at an intermediate step of unloading; and Figure 9 is a vertical sectional view on an enlarged scale, taken along the lines 9—9 of Figure 8.

Figure 1:
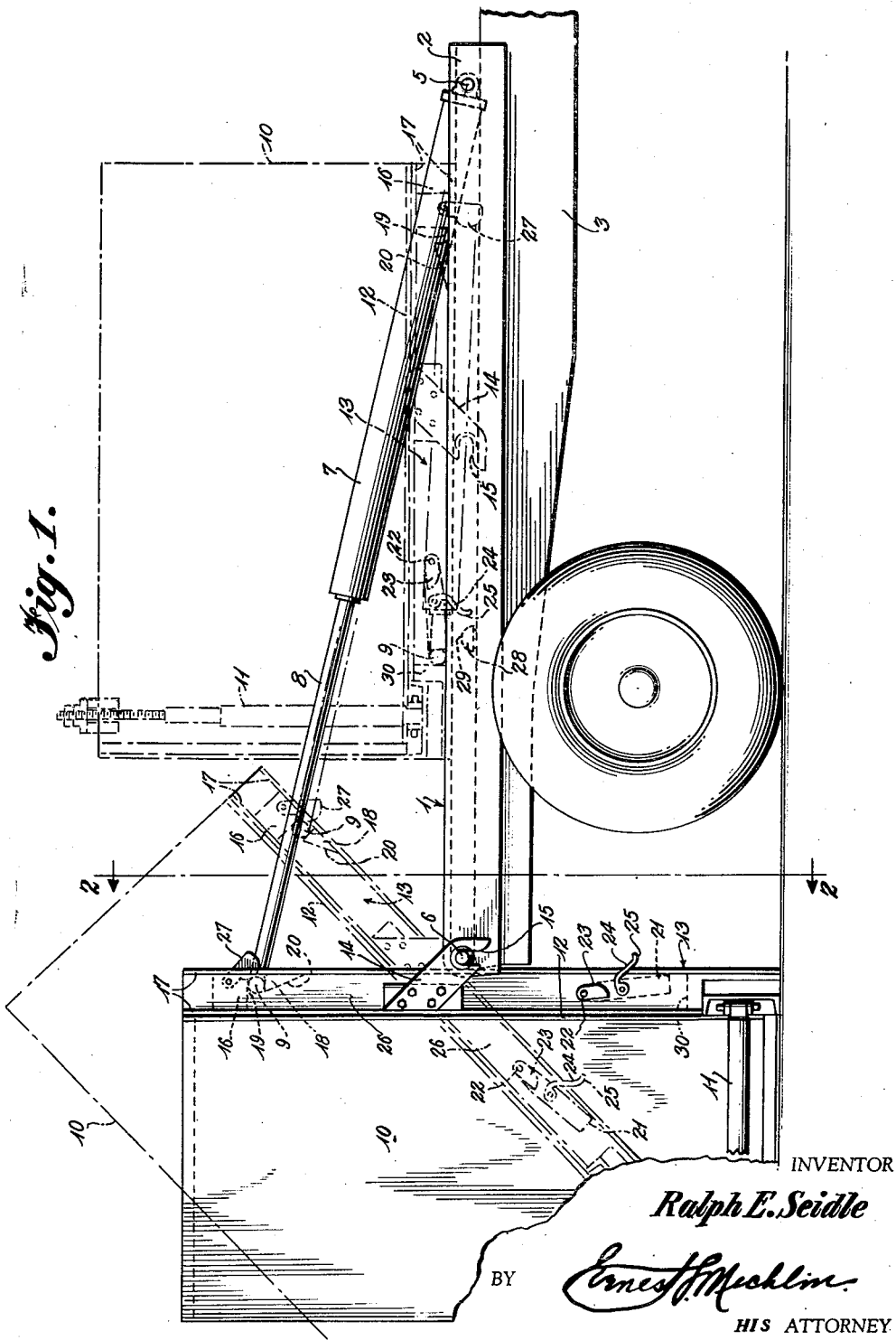
Figure 1 is a side elevational view of the improved hauling unit of the present invention showing fragmentarily the frame of the vehicle on which it is mounted.

Referring now in detail to the drawings in which like reference characters designate like parts, the improved hauling unit of the present invention is intended to provide a truck or other vehicle with a movable body which can be tilted from its usual or normal horizontal position to an upright position with its end resting upon the ground, for handling bricks or other palletizable loads, and, when swung to horizontal position, can be shifted longitudinally of the vehicle. The unit is particularly designed to obtain these movements with a hydraulic or other fluid pressure mechanism of relatively short stroke, with consequent compactness of the unit.

To the above end, the illustrated embodiment of the apparatus is comprised of a subframe 1, mountable on a frame of a truck or like vehicle, and formed of a pair of box members 2, each seatable on one of the main longitudinal frame members 3 of the vehicle frame. Linking these members, adjacent their front and rear ends, are a pair of cross-members, the one adjacent the rear end of the subframe a cross-shaft 4 and that at the forward end of the frame, a cross-rod 5. As shown, the shaft 4 extends through and has its ends 6 projecting laterally beyond the outer edges of the box members or side rails 2.

The other of the pair, the cross-rod 5, has its ends suitably journaled in the side rails and is rigidly connected to and supports, intermediate the side rails, a hydraulic or other fluid pressure cylinder 7. This cylinder and its piston rod 8 project or extend rearwardly of the cross-rod 5, longitudinally of the subframe. At its outer end, the piston rod carries an integral cross-bar or head 9 which is disposed transversely of the piston rod and extends across and partly overlies the side rails 2.

The companion portion of the hauling unit is a body 10 which is designed to be swung about the rear end of the subframe 1, while carried on the projecting ends 6 of the cross-shaft 4, and both to be swung and moved longitudinally of the subframe through the cross-head 9 of the hydraulic mechanism. For handling bricks and like palletizable loads, the body is preferably provided with an open rear end and has, at that end, a suitable clamping device 11 for gripping and forming a pallet of the lowermost course of a stack of bricks. Attached to the bottom or underside 12 of the body and extending longitudinally thereof are a pair of skids or shoes 13 having the same transverse spacing as and adapted to ride or slide on the side rails 2 of the subframe, for which purpose the illustrated I-beams are particularly suited. To the outer sides of the I-beams 13 are attached a pair of rocker, pivot or hanger members 14, each having, adjacent its outer end, a downwardly or rearwardly opening, U-shaped slot 15 for receiving the projecting ends 6 of the cross-shaft 4 of the subframe. These rocker members are so positioned relative to the body 10 that their slots 15 are disposed off-center, above the transverse center line of the body, to enable the body to pivot or swing of its own weight to upright or vertical position.

For drivably connecting the cross-head 9 to the body, there are provided on the latter a pair of spaced seats, one adjacent either end of the body, with which the cross-head is selectively and successively or alternately engageable, in the manner to be hereinafter explained. The upper or forward seat, adjacent the upper or forward end of the body, may be formed by affixing to the inner side faces of the I-beams 13, above the rockers 14, a pair of stops or stop members 16, which preferably extend laterally between the flanges 17 of each I-beam. The companion component of each upper seat is a plate 18, which is attached to the inner side of the associated I-beam, adjacent the outer of the flanges 17, and is spaced below its stop member 16 to provide a seat, aperture or recess 19 therebetween. The plate 18 is preferably substantially right-triangular, with its outer edge 20 inclined upwardly toward the associated stop member to form a ramp leading to the aperture 19. Toward the lower end of the body, on the opposite side of the rockers 14 from the stop members 16, there are mounted on the inner side faces of the I-beams a pair of latch or lock bars or members 21, which are pivotally attached adjacent their rocker-confronting ends to the side rails by pins or the like 22. To the outer ends of these pins, beyond the outer side faces of the I-beams and clear of the flanges 17 of the latter, are keyed cams 23. These cams, and through them the locking members 21, are adapted to be engaged and actuated or moved by movement in one direction of a release or tripping member 24, which is also pivotally mounted on the outer side face of each of the I-beams, these tripping members each being of substantially L-shape and having an outer leg 25 adapted to underride and lift or raise the outer end of the cam 23 and, through it, that of the associated locking member.

When the parts of the hauling unit are in assembled relation, the cross-head 9 of the hydraulic mechanism extends between the webs 26 of the I-beams and has its ends contained by the flanges 17 of the beams. With the body in the upright position shown in full line in Figure 1, the rocker members 14 seat and support the body 10 on the projecting ends 6 of the cross-shaft 4. At this time, the cross-head 9 rests in the aperture 19 between the stop members 16 and the triangular plate 18. Assuming the body then to be encompassing a stack of bricks gripped by the clamping member 11 through the lower course of the stack, power is applied to the hydraulic mechanism to retract the cross-head 9, causing the body to pivot or swing about the cross-shaft 4 until it reaches horizontal position. The body is then slid along the subframe by further retraction of the cross-head until the center of gravity of the body has been brought within the rear end of the frame, this signalling the end of the initial stroke of the piston. At this point, shown in Figure 3, a pair of one-way releasing cams 27 comes into play, these cams, each pivotally mounted on the inner side faces of the I-beams 13 and normally hanging below the cross-head receiving aperture 19, contact or are engaged by abutments 28 carried by the side rails 2 of the subframe and through the cam surfaces 29 of the abutments will force upwardly against the cross-head 9, raising the latter free of the apertures 19.

The initial stroke of the piston so completed, the cross-head 9 is reversed in its direction of movement and extended relative to the hydraulic cylinder 7. In process, the ends of the cross-head ride down the ramp 20 of the plate 18 and along the lower of the flanges 17 of the I-beams, past the rockers 14, until the cross-head is stopped by a shoulder 30 on each of the I-beams beyond or below the lock members 21. On reaching the latter, the cross-head slides under the lock members 21, progressively displacing them until it engages the shoulders 30, when the lock members drop back into place, locking the cross-head between their outer ends and the shoulders, as shown in Figure 4. Thereupon, the cross-head, seated between the shoulders and lock bars, is again retracted to shift the body further forward, until the cross-head is fully retracted and the entire body is within the frame of the vehicle.

After the load of brick or other material has been carried to its destination and the vehicle stopped at the desired position, the cross-head 9, through the hydraulic mechanism, is extended to shift the body backwardly of the subframe. As the body moves backwardly, the tripping members 24 which rode freely over the cross-shaft 4 on loading are forced by the cross-shaft against the lock member-associated cams 23, swinging the lock members out of locking position and releasing the cross-head 9. The cross-head is then retracted and caused to slide along the lower of the flanges 17 and up the ramps 20 of the plates 18 until its ends are again seated in the apertures 19. Thereafter, further extension of the cross-head brings the rocker members 14 into engagement with the cross-shaft 4, whereupon the body swings or pivots about the cross-shaft under control of the cross-head, until the end of the body again rests on the ground. On release of the clamping member 11, the stack of bricks is released and the empty body is then returned to normal or carrying position by the same sequence of movements described in the loading of a loaded body.

From the above detailed description, it will be apparent that there has been provided an improved hauling unit which is compact, efficient in operation and enables a vehicle readily to be adapted for handling palletized and other loads requiring a tiltable body. It should be understood that the described and disclosed embodiment is merely exemplary of the invention and that all modifications are intended to be included which do not depart either from the spirit of the invention or the scope of the appended claims.

Having described my invention, I claim:

1. A hauling unit for vehicles comprising a body, means for pivotally attaching said body to a vehicle, a plurality of longitudinally spaced seats on said body, and fluid pressure means reciprocable longitudinally of said vehicle and successively engageable with said seats for moving said body onto and off of said vehicle, said fluid pressure means on engagement with one of said seats swinging said body on said attaching means and on engagement with another of said seats shifting said body longitudinally of said vehicle.

2. A hauling unit for vehicles comprising a body mountable on a vehicle frame, spaced means on said body, and means carried by said frame and reciprocable longitudinally thereof, said reciprocable means being engageable with one of said spaced means for swinging said body relative to said frame and with another of said spaced means for shifting said body longitudinally relative to said frame and by successively engaging said spaced means moving said body onto and off of said frame.

3. A hauling unit for vehicles comprising a body mountable on a vehicle frame, fluid pressure means carried by said frame and reciprocable longitudinally thereof, spaced means on said body and successively engageable by said reciprocable means for moving said body onto and off of said frame, said reciprocable means on engagement with one of said spaced means swinging said body relative to said frame and on engagement with another of said spaced means shifting said body longitudinally of said frame, and cam means for disengaging said reciprocable means from said spaced means.

4. A hauling unit for vehicles comprising a body mountable on a vehicle frame, fluid pressure means carried by said frame and reciprocable longitudinally thereof, spaced means on said body, said reciprocable means being engageable with one of said spaced means for swinging said body relative to said frame and with another of said spaced means for shifting said body longitudinally of said frame and by successively engaging said spaced means moving said body onto and off of said frame, and one-way cam means for disengaging said reciprocable means from said spaced means.

5. A hauling unit for vehicles comprising a body mountable on a vehicle frame, fluid pressure means carried by said frame and reciprocable longitudinally thereof, spaced means on said body and selectively engageable by said reciprocable means for swinging and shifting said body relative to said frame, cam means associated with each of said spaced means, and means carried by said frame and engageable with said cam means for actuating said cam means and selectively disengaging said reciprocable means from said spaced means in predetermined relation to movement of said body relative to said frame.

6. A hauling unit for vehicles comprising a body, means for pivotally connecting said body to a vehicle frame, fluid pressure means carried by and reciprocable longitudinally of said frame, seat means on said body and engageable by said fluid pressure means for swinging said body relative to said frame, and second seat means on said body and spaced from said first seat means, said second seat means being engageable by said fluid pressure means for shifting said body longitudinally relative to said frame.

7. A hauling unit for vehicles comprising a body, means for pivotally connecting said body to a vehicle frame, fluid pressure means carried by and reciprocable longitudinally of said frame, seat means on said body and engageable by said fluid pressure means for swinging said body relative to said frame, second seat means on said body and spaced from said first seat means, said second seat means being engageable by said fluid pressure means for shifting said body longitudinally relative to said frame, and cam means associated with each of said seat means for disengaging said fluid pressure means therefrom.

8. A hauling unit for vehicles comprising a body, means for pivotally connecting said body to a vehicle frame, fluid pressure means carried by and reciprocable longitudinally of said frame, seat means on said body and engageable by said fluid pressure means for swinging said body relative to said frame, second seat means on said body and spaced from said first seat means, said second seat means being engageable by said fluid pressure means for shifting said body longitudinally relative to said frame, cam means associated with each of said seat means, and means carried by said frame and engageable with said cam means for actuating said cam means and selectively disengaging said reciprocable means from said spaced seat means in predetermined relation to movement of said body relative to said frame.

9. A hauling unit for vehicles comprising a subframe mountable on a vehicle frame, a body carried by and movable relative to said subframe, fluid pressure means reciprocable longitudinally of said subframe, spaced seat means on said body and selectively engageable by said fluid pressure means for swinging and shifting said body relative to said subframe, and cam means associated with each of said seat means and actuatable by means on said subframe for disengaging said fluid pressure means from each of said seat means in predetermined relation to movement of said body relative to said subframe.

10. A hauling unit for vehicles comprising a body mountable on a vehicle frame, spaced means on said body, means carried by said frame and reciprocable longitudinally thereof, said reciprocable means being engageable with one of said spaced means for swinging said body relative to said frame and with another of said spaced means for shifting said body longitudinally relative to said frame and by selectively engaging said spaced means moving said body onto and off of said frame, and means on said body for guiding said reciprocable means in said selective engagement.

References Cited in the file of this patent
UNITED STATES PATENTS

| | | |
|---|---|---|
| 878,751 | Schreiber | Feb. 11, 1908 |
| 1,289,786 | Ittner | Dec. 31, 1918 |
| 1,429,004 | Wick | Sept. 12, 1922 |
| 1,522,116 | Gray et al. | Jan. 6, 1925 |
| 2,170,932 | Venema | Aug. 29, 1939 |
| 2,189,052 | Anthony | Feb. 6, 1940 |
| 2,308,648 | De Vry et al. | Jan. 19, 1943 |
| 2,415,597 | Le Du | Feb. 11, 1947 |
| 2,529,777 | McInnis | Nov. 14, 1950 |
| 2,534,156 | Wyatt et al. | Dec. 12, 1950 |
| 2,552,627 | Fontaine | May 15, 1951 |
| 2,572,687 | Anderson et al. | Oct. 23, 1951 |
| 2,606,676 | Dempster | Aug. 12, 1952 |